US 6,711,138 B1

(12) United States Patent
Pai et al.

(10) Patent No.: US 6,711,138 B1
(45) Date of Patent: Mar. 23, 2004

(54) DIGITAL SUBSCRIBER LINE/HOME PHONELINE NETWORK ROUTER

(75) Inventors: Prasan Pai, Mission Viejo, CA (US); Nick C. Burd, Irvine, CA (US); Kevin V. Strong, Irvine, CA (US); P. Michael Henderson, Tustin, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/408,639

(22) Filed: Sep. 30, 1999

(51) Int. Cl.$^7$ .................. H04L 12/28; H04L 12/66; H04J 3/22
(52) U.S. Cl. .............. 370/257; 370/352; 370/401; 370/466; 370/469; 710/313; 375/222
(58) Field of Search ................. 370/401, 402, 370/466, 467, 469, 355, 484, 445, 465, 257, 236, 463, 493, 356; 455/560; 375/221, 222; 710/313

(56) References Cited

U.S. PATENT DOCUMENTS

| | | | | |
|---|---|---|---|---|
| 5,654,962 A | * | 8/1997 | Rostoker et al. | 370/232 |
| 5,910,970 A | * | 6/1999 | Lu | 375/377 |
| 6,061,357 A | * | 5/2000 | Olshansky et al. | 370/401 |
| 6,075,784 A | * | 6/2000 | Frankel et al. | 370/356 |
| 6,094,441 A | * | 7/2000 | Jung et al. | 370/466 |
| 6,101,216 A | * | 8/2000 | Henderson et al. | 375/222 |
| 6,130,879 A | * | 10/2000 | Liu | 370/230 |
| 6,137,839 A | * | 10/2000 | Mannering et al. | 375/260 |
| 6,137,865 A | * | 10/2000 | Ripy et al. | 379/93.05 |
| 6,563,816 B1 | * | 5/2003 | Nodoushani et al. | 370/352 |

OTHER PUBLICATIONS

*3COM® OfficeConnect®, Remote 810 ADSL Router Datasheet,* © 1999.
*Remote 810 ADSL Router,* 3COM®, http://www.3com.com/products/dsheets/400499.html.
*Cisco 675 SOHO/Telecommuter ADSL Router,* Cisco Systems Datasheet, © 1999.
*WebRamp 500i,* © 1999 Ramp Networks, Inc.
*Cisco 605 Personal PCI ADSL Modem,* Cisco Systems, Datasheet, © 1998.
*WebRamp Network Architecture,* Ramp Networks, © 1997–1999, http://www.rampnet.com/products/architecture.html.
*82559 Fast Ethernet Multifunction PCI Controller,* Intel Corporation © 1999, http://developer.intel.com/design/network/82559.htm.
*21145 Phoneline/Ethernet LAN Controller,* Intel Corporation © 1999, http://developer.intel.com/design/network/21145.htm.
*Cisco 600 DSL CPEs, Cisco Systems,* © 1992–1999, http://cisco.com/warp/public/cc/cisco/mkt/access/cpe600/index.shtml.
*Simple, High–Speed Ethernet Technology For The Home,* White Paper, Home Phoneline Networking Alliance, Jun., 1998, pp. 1–11.

* cited by examiner

*Primary Examiner*—Duc Ho
(74) *Attorney, Agent, or Firm*—Akin Gump Strauss Hauer & Feld, LLP

(57) ABSTRACT

A digital subscriber line (DSL)/home phoneline network router provides DSL connectivity and home networking support. The router provides a single phoneline connection (RJ-11 jack) to access either the Internet or a home phoneline network. In terms of hardware, the router may include a central processing unit, a DSL modem, and a home phoneline networking device (media access controller and home phoneline networking physical interface). In terms of software, the router may include a DSL driver, a local area network (LAN) driver, a media access controller driver, network routing stacks and a real time operating system.

18 Claims, 4 Drawing Sheets

DIGITAL SUBSCRIBER LINE/HOME PHONELINE NETWORK ROUTER

BACKGROUND

1. Field of the Invention

The present invention generally relates home networking technology and more particularly to a digital subscriber line/home phoneline network router.

2. Description of the Related Art

As home networking continues to emerge, there is a growing need for high-speed connections to rapidly supply digital data within homes. Businesses typically achieve high-speed connections by deploying local area networks (LANs). These networks, however, are not commonly employed in the home due to the cost and complexity of installing new wiring required by traditional LANs.

The Home Phoneline Networking Alliance (Home PNA) has proposed high-speed home networks using a consumer's existing phoneline. Many products such as personal computers (PCs), home gateway computers, cable modems, DSL (Digital Subscriber Line) modems, digital set-top boxes, digital televisions, digital radios, digital cameras, digital telephones and other network appliances stand to benefit from high-speed connections to a home network. Home phoneline networking technology has been designed to ensure compatibility with other communication services within the home, such as voice, ISDN (Integrated Services Digital Network), and DSL data services. Since a home phoneline network is an Ethernet-compatible LAN, phoneline networking technology has leveraged existing Ethernet software and hardware.

Translating, addressing and routing control for home networks has traditionally been managed by home network controllers and/or home gateway computers. In contrast, traditional LANs have typically been managed with network routers. Such network routers include DSL-Ethernet routers and ISDN-Ethernet routers targeted to businesses. These routers have been difficult to install and use.

SUMMARY OF THE INVENTION

Briefly, a digital subscriber line (DSL)/home phoneline network router provides DSL connectivity and home networking support. The router provides a single phone line connection (RJ-11 jack) to access either the Internet or a home phoneline network. In terms of hardware, the router may include a central processing unit, a DSL modem, and a home phoneline networking device (media access controller and home phoneline networking physical interface). In terms of software, the router may include a DSL driver, a local area network (LAN) driver, a media access controller driver, network routing stacks and a real time operating system.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

Figure 1:
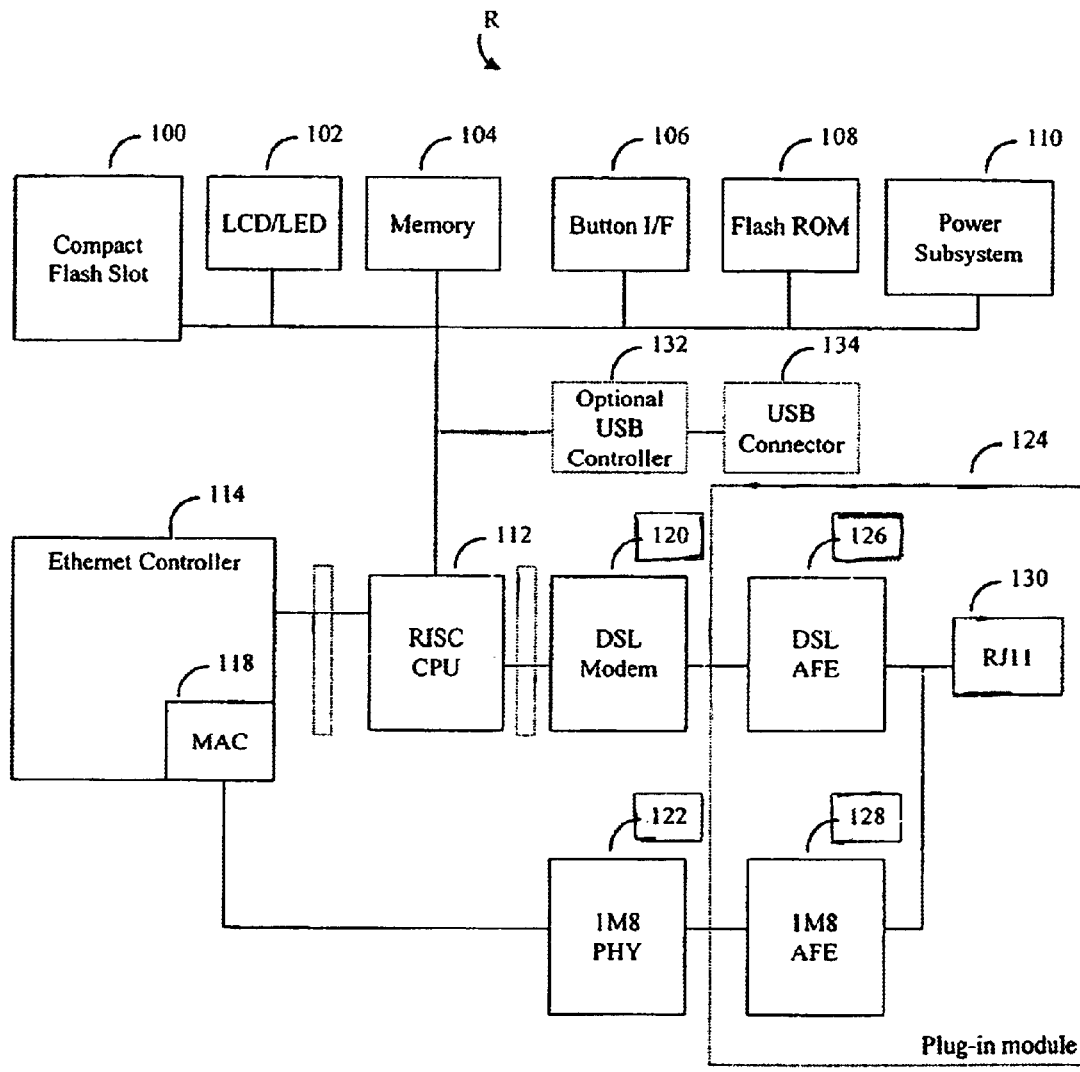
FIG. 1 is a block diagram of an exemplary hardware architecture of a digital subscriber line/home phoneline network router.

Turning now to the drawings, FIG. 1 shows an exemplary hardware architecture for a digital subscriber line (DSL)/home phoneline network router R. The router or bridge R includes a reduced instruction set computer (RISC) central processing unit (CPU) 112 to handle the overall management of the router R. For example, the CPU 112 can handle DSL modem control, ATM (Asynchronous Transfer Mode) segmentation and reassembly (SAR) and other ADSL protocol processing, LAN (Local Area Network) protocol, and communications with a universal serial bus (USB) controller. As an alternative to the CPU 112, a digital signal processor can be used. The CPU 112 is shown coupled to a Ethernet controller 114 and a DSL modem 120. The Ethernet controller 114 includes a media access controller (MAC) 118. Both the Ethernet controller 114 and the MAC 118 may be implemented in other ways. For example, the MAC 118 can be integrated with the CPU 112. In a disclosed embodiment, the MAC 118 is effectively compliant with the I.E.E.E. 802.3 standard for 10 Mbps Ethernet networking. The MAC 118 is coupled to a 1M8 physical layer device 122. The 1M8 physical layer (PHY) device 122, a home phoneline networking physical layer device, is described in the Home Phoneline Networking Alliance (HPNA) 1M8 PHY Specification, Version 1.0. Alternatively, the 1M8 PHY 122 can conform to the upcoming 10 Mbps Home Phoneline Networking Alliance 2.0 Specification. The 1M8 PHY 122 generally enables home networking by allowing Ethernet packets to be transported over standard home telephone wiring using standard Ethernet CSMA/CD (Carrier Sense Multiple Access/Collision Detect) Media Access Control (MAC) procedures as specified in the I.E.E.E. 802.3 standard. The 1M8 PHY 122 generally serves as a home phoneline networking physical interface. The 1M8 PHY 122 and the MAC 118 together generally serve as a home phoneline networking device. An optional USB interface may be designed into the router R as well for host connectivity.

The DSL modem 120 and the 1M8 PHY 122 may both be coupled to a plug-in module 124 containing a DSL analog front end (AFE) 126, a 1M8 AFE 128 and an RJ-11 jack 130. More particularly, the DSL modem 120 is coupled to the DSL AFE 126, and the 1M8 PHY 122 is coupled to the 1M8 AFE 128. Communication between the 1M8 PHY 122 and the MAC 118 is generally understood in the art. As an alternative to a plug-in configuration, the DSL AFE 126, 1M8 AFE 128 and RJ-11 jack 130 may be directly integrated into the router R. As an alternative to the RJ-11 jack, other types of customer premise equipment/telephone company interfaces might be used.

By integrating the 1M8 PHY 122, the 1M8 AFE 128, the MAC 118, the DSL modem 120, and the DSL AFE 126, the router R provides the appropriate hardware to enable home networking and DSL connectivity. DSL should be understood to refer to any of the technologies in the DSL family, such as symmetric DSL (SDSL), Asymmetric DSL (ADSL), High-Speed DSL (HDSL), and G. Lite. Those skilled will appreciate that there can be variations in configurations for the router R depending on the particular DSL technology implemented. ADSL is currently the preferred standard in the industry. Further, the router R supports both home networking (PHY) layer functionality and Ethernet (MAC) layer functionality.

The CPU 112 is further coupled to a set of status light emitting diodes (LEDs) and a liquid crystal display (LCD) 102, a memory 104, a button interface (I/F) 106, a flash read only memory (ROM) 108, a power subsystem 110 and a compact flash slot 100. The LEDs 102 may include a home phoneline network indicator to indicate active home networking functionality and a DSL indicator to indicate active DSL connectivity.

Figure 2:
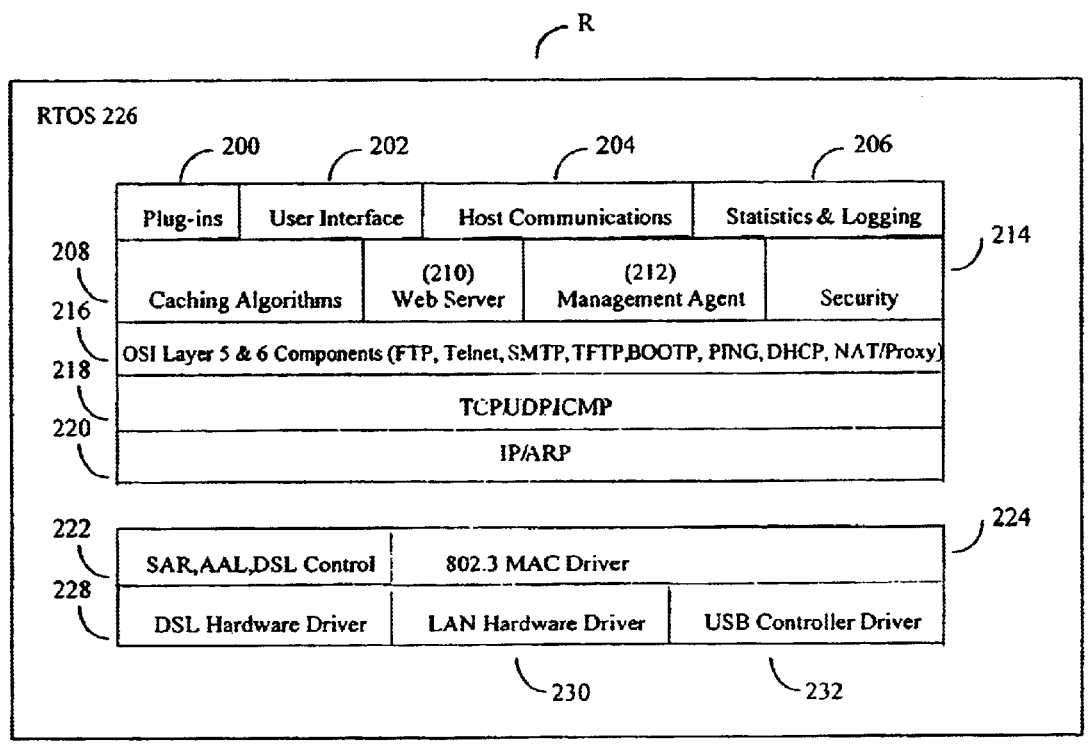
FIG. 2 is a diagram of an exemplary software architecture of the digital subscriber line/home phoneline network router of FIG. 1.

Referring to FIG. 2, an exemplary real time software architecture for the router R is shown. The router R is shown including a real time operating system (RTOS) 226. The RTOS 226 provides functions and services to a number of illustrative software components: software plug-ins 200 for OEM customization, a user interface 202, a host communications module 204, a statistics and logging module 206, caching algorithms 208, a web server component 210, a management agent module 212 to support SNMP (Simple Network Management Protocol), a security module 214 to support a firewall and IP (Internet Protocol) source and destination filtering, OSI (Open System Interconnection) layers 5 and 6 (session and presentation) module 216, a TCP (Transmission Control Protocol)/UDP (User Datagram Protocol)/ICMP module 218, an IRP and ARP (Address Resolution Protocol) module 220, an SAR, AAL, and DSL control module 222, a MAC driver 224, a DSL hardware driver 228, a LAN hardware driver 230 and a USB controller driver 232. These software components which can run on the CPU 112 may be stored in the memory 104 or the flash ROM 108. Those skilled in the art will appreciate the techniques which might be employed to integrate the illustrated software and drivers within the router R. Use of software such as that illustrated enables the router R to handle bridging, routing, proxy and other related services in a residential environment. Like a typical router, the router R can support full-featured bridging and routing capabilities. Other arrangements of software components or modules to support the router R are possible. The OSI layers 5 and 6 module 216 provides network routing stacks to implement a typical router algorithm such as Network Address Translation (NAT). The web server 204 is used in configuring the CPU 112, the DSL modem 120 and the MAC 118.

Figure 3:
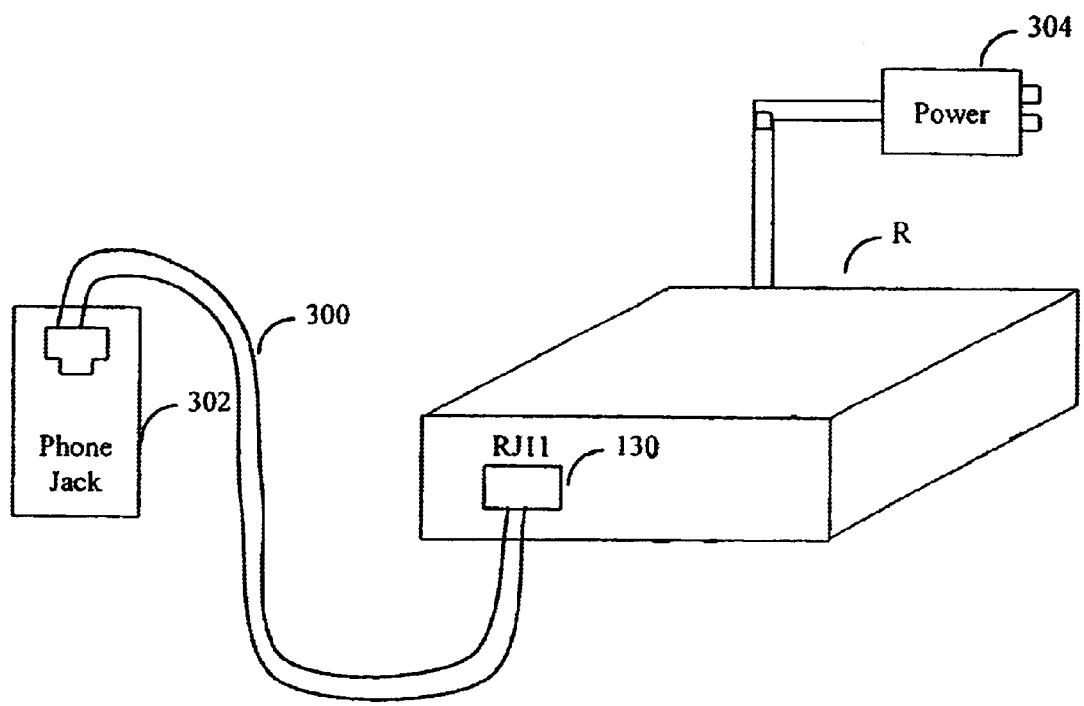
FIG. 3 is an isometric view of the digital subscriber line/home phoneline network router of FIGS. 1 and 2.

Referring to FIG. 3, an exemplary digital subscriber line/home phoneline network router is shown. Power is supplied to the router R through a plug 304. The router R includes the RJ-11 jack or connector 130 for connection via a phone wire 300 to a wall phone jack 302. The single phone wire 300, which handles both DSL connectivity and home phoneline connectivity, allows for ease of installation for the router R. The phone wire 300 serves to connect the DSL AFE 126 to a public network and serves to connect the 1M8 AFE 128 to a phoneline network. The RJ-11 jack 130 serves as both a home phoneline network interface and a DSL interface. As shown in FIG. 1, the RJ-11 jack couples the DSL AFE 126 and the 1M8 AFE 128. The router R presents only a single RJ-11 jack 130 to a user. With the single phoneline 300 and the single RJ-11 jack 130, the router R can handle concurrent DSL connectivity and home phoneline connectivity.

Figure 4:
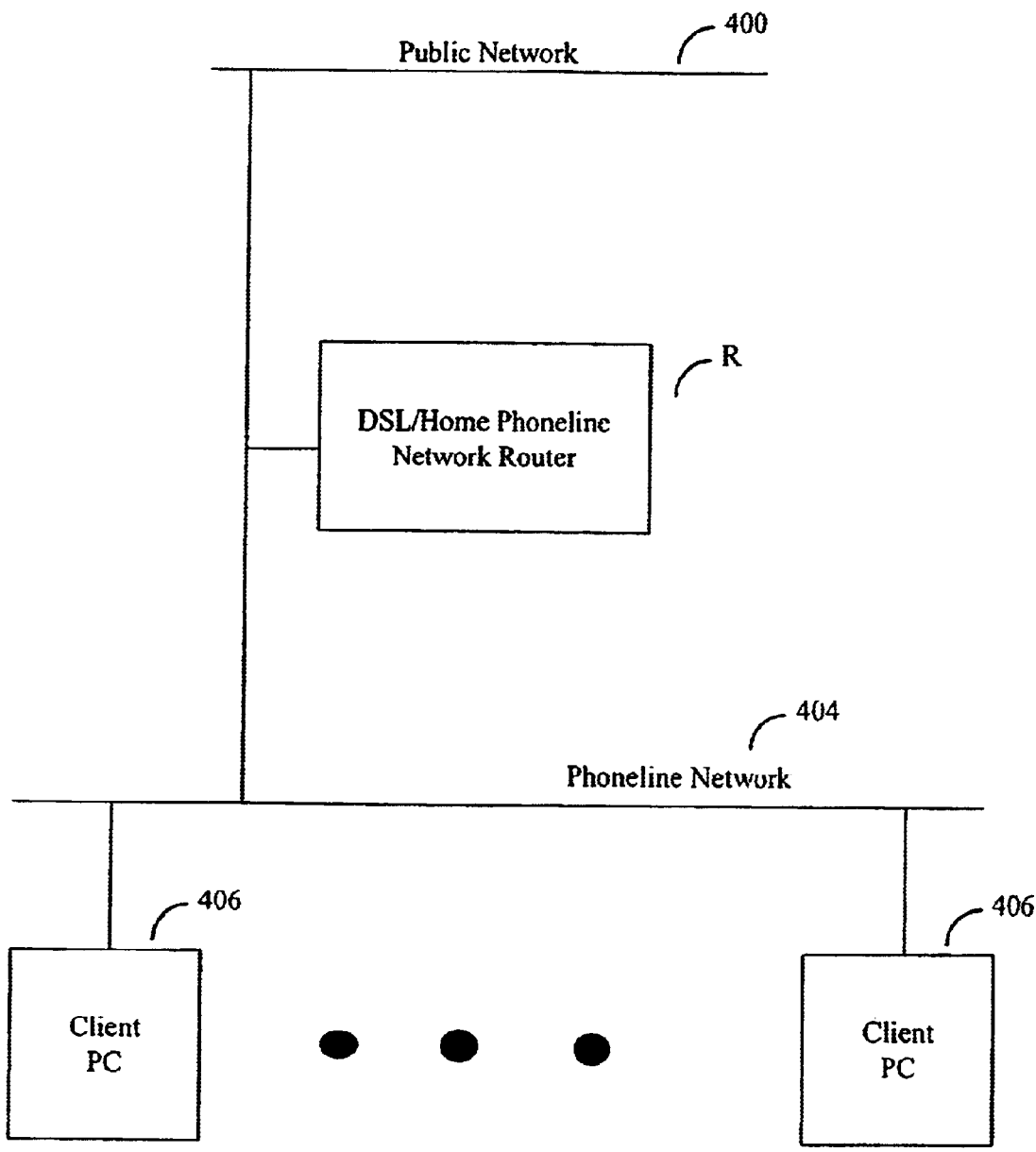
FIG. 4 is a block diagram of an exemplary home network environment including the digital subscriber line/home phoneline network router of FIGS. 1–3.

Referring to FIG. 4, an exemplary home phoneline network environment is shown. This network environment includes the digital subscriber line/home phoneline network router R. The router R is shown coupled to a public network 400 (such as the Public Network) and a phoneline network 404. The phoneline network 404 is further coupled to multiple client personal computers (PCs) 406. Packets are transmitted to and from the client PC 406 on the phoneline network 404. The phoneline network 400 may, for example, be a 1 Mbps home phoneline network or a 10 Mbps home phoneline network effectively compliant with the standards of the Home Phoneline Networking Alliance. Internet access and other services for the client PCs 406 are accomplished through the router R. The clients PCs 406 may connect to the Internet or a remote LAN. In addition, the client PCs 406 can utilize the web server 204 to properly configure the router R. While only client PCs 406 are shown connected to the phoneline network 404, it should be understood that a variety of network devices (e.g., digital telephones, digital televisions and laptops) may also be connected to the phoneline network 404. Other configurations of a home phoneline network environment supporting the router R are possible.

It should be understood that the disclosed functionality and structure may be integrated into high speed access products other than a router or bridge. While DSL services are mentioned in connection with the disclosed router, it should be understood that alternatively a router or other high speed access device might support derivative, compliant or similar high speed data services available on the Public Switched Telephone Network.

We claim:

1. A digital subscriber line/home phoneline network router, comprising:

a central processing unit;

a digital subscriber line modem coupled to the central processing unit;

a media access controller coupled to the central processing unit;

a home phoneline networking physical interface coupled to the media access controller;

a digital subscriber line analog front end coupled to the digital subscriber line modem;

a home phoneline networking analog front end coupled to the home phoneline networking physical interface; and a customer premise equipment/telephone company interface coupled to the digital subscriber line analog front end and the home phoneline networking physical interface, wherein the media access controller communicates with a home phoneline network via the home phoneline networking physical interface, and wherein the digital subscriber line analog front end, the home phoneline networking analog front end, and the customer premise equipment telephone company interface are provided on a plug-in card.

2. The router of claim 1, wherein the customer premise equipment telephone company interface comprises an RJ-11 jack.

3. The router of claim 1 further comprising:

a wire coupled to the customer premise equipment/telephone company interface to support digital subscriber line connectivity and home phoneline connectivity.

4. The router of claim 1, wherein the home phoneline networking physical interface comprises a home networking 1M8 physical layer device.

5. The router of claim 1, further comprising:

a universal serial bus controller coupled to the central processing unit.

6. The router of claim 5, the memory comprising:
a media access controller driver.

7. The router of claim 5, the memory comprising:
a web server to configure the central processing unit, digital subscriber line modem and media access controller via computer(s) coupled to the home phoneline networking physical interface.

8. The router of claim 1, further comprising:
a memory containing a digital subscriber line driver and a local area network driver.

9. A home phoneline network environment, comprising:
a phoneline network;
a plurality of computers coupled to a phoneline network;
a public network; and
a digital subscriber line/home phoneline network router coupled to the phoneline network and the public network, the router comprising:
  a central processing unit;
  a digital subscriber line modem coupled to the central processing unit;
  a media access controller coupled to the central processing unit;
  a home phoneline networking physical interface coupled to the media access controller; and
  a digital subscriber line analog front end coupled to the digital subscriber line modem;
  a home phoneline networking analog front end coupled to the home phoneline networking physical layer device; and
  a customer premise equipment/telephone company interface coupled to the digital subscriber line analog front end and the home phoneline networking physical interface,
wherein the media access controller communicates with the phoneline network via the home phoneline networking physical interface, and
wherein the digital subscriber line analog front end, the home phoneline network analog front end, and the customer premise equipment/telephone company interface are provided on a plug-in card.

10. The network environment of claim 9, wherein the customer premise equipment/telephone company interface comprises an RJ-11 jack.

11. The network environment of claim 9, the router further comprising:
a wire coupled to the customer premise equipment/telephone company interface to support digital subscriber line connectivity and home phoneline connectivity.

12. The network environment of claim 9, wherein the home phoneline networking physical interface comprises a home networking 1M8 physical layer device.

13. The network environment of claim 9, the router further comprising:
a universal serial bus controller coupled to the central processing unit.

14. The network environment of claim 9, the router further comprising:
a memory containing a digital subscriber line driver, a local area network driver, and network routing stacks.

15. The network environment of claim 14, the memory comprising:
a media access controller driver.

16. The network environment of claim 14, the memory comprising:
a web server to configure the central processing unit, digital subscriber line modem and media access controller via computer(s) coupled to the home phoneline networking physical interface.

17. A home phoneline network high-speed access routing device, comprising:
a central processing unit;
a high speed data service modem means coupled to the central processing unit for establishing high speed data connectivity with a public network;
a media access controller coupled to the central processing unit;
a home phoneline networking physical interface means for communicating with the media access controller and a phoneline network;
a high speed data service analog front end means for communicating with the public network;
a home phoneline networking analog front end means for communicating with the phoneline network; and
a customer premise equipment/telephone company interface means for coupling the high speed data service analog front end means and the home phoneline networking analog front end means,
wherein the media access controller communicates with the phoneline network via the home phoneline networking physical interface, and
wherein the high speed data service analog front end means, the home phoneline network analog front end means, and the customer premise equipment/telephone company interface means are provided on a plug-in card.

18. The routing device of claim 17, further comprising:
a telephone physical connection means for connecting the high speed data service analog front end means to a public network and the home phoneline networking analog front end means to a phoneline network.

* * * * *